United States Patent
Kobayashi et al.

[11] Patent Number: 6,138,732
[45] Date of Patent: Oct. 31, 2000

[54] PNEUMATIC TIRES WITH RUN FLAT REINFORCING STRIP RUBBER

[75] Inventors: Kazuomi Kobayashi, Higashimurayama; Tomohisa Nishikawa; Kenji Matsuo, both of Kodaira, all of Japan

[73] Assignee: Bridgestone Corporation, Tokyo, Japan

[21] Appl. No.: 09/258,141

[22] Filed: Feb. 26, 1999

[30] Foreign Application Priority Data

Feb. 27, 1998 [JP] Japan .................................. 10-046770

[51] Int. Cl.$^7$ .......................... B60C 15/00; B60C 15/06; B60C 17/00
[52] U.S. Cl. .......................... 152/539; 152/517; 152/547; 152/550; 152/553; 152/555
[58] Field of Search ..................................... 152/517, 541, 152/547, 555, 553, 550

[56] References Cited

FOREIGN PATENT DOCUMENTS

| 55-68406 | 5/1980 | Japan . |
|---|---|---|
| 1-278806 | 11/1989 | Japan . |
| 3-176213 | 7/1991 | Japan . |
| 4-345505 | 12/1992 | Japan . |

*Primary Examiner*—Adrienne C. Johnstone
*Attorney, Agent, or Firm*—Sughrue, Mion, Zinn, Macpeak & Seas, PLLC

[57] ABSTRACT

A pneumatic tire comprises a carcass of at least one rubberized ply of a radial arrangement, a belt comprised of two or more cross cord layers, a pair of thick reinforcing strip rubbers located at an inner face side of the carcass and a bead filler rubber, in which the reinforcing strip rubber and bead filler rubber have specified JIS hardness and rebound resilience, hardness ratio and maximum gauge ratio.

3 Claims, 7 Drawing Sheets

FIG_2
Longitudinal direction of cord
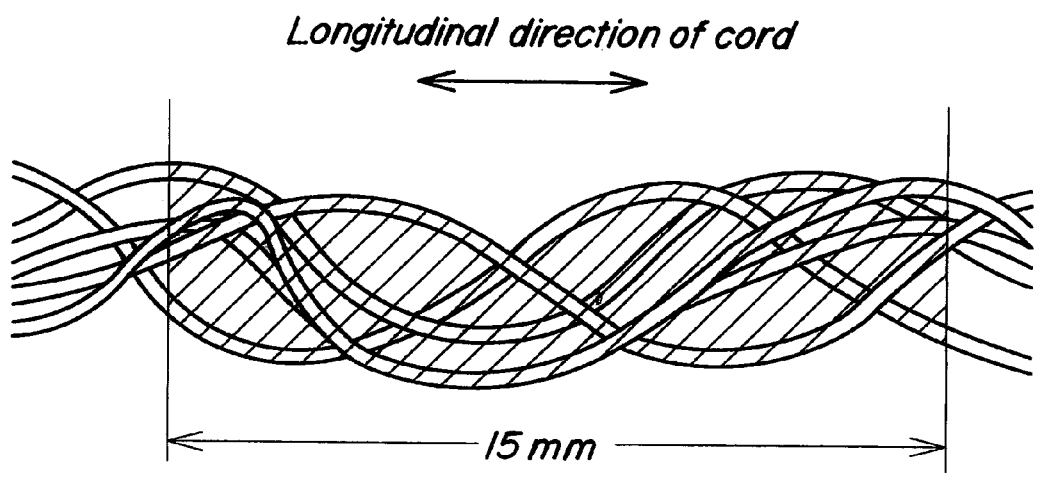
15 mm
FIG_3
Longitudinal direction of cord
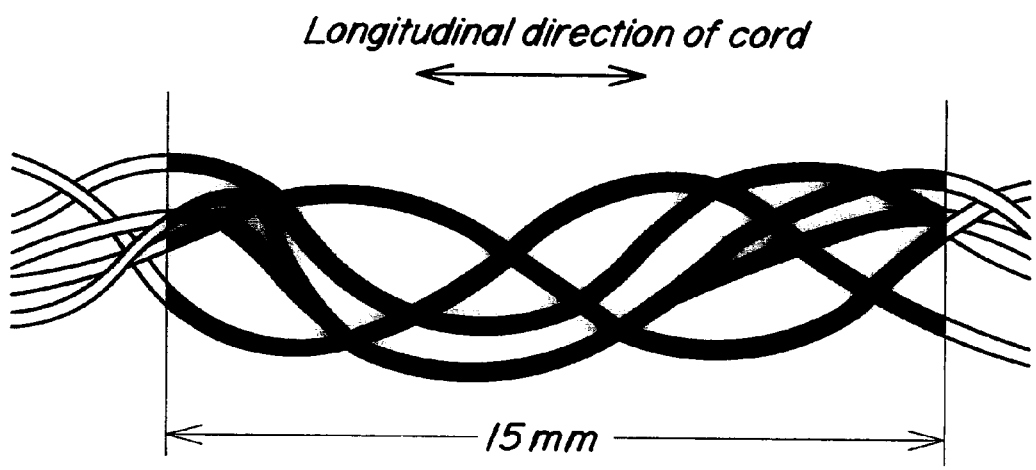
15 mm

FIG_6
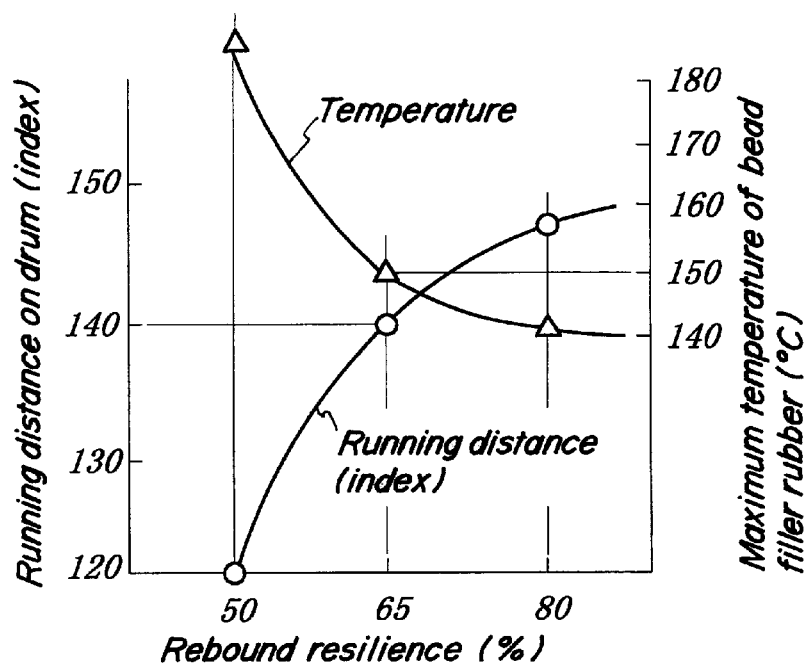
FIG_7
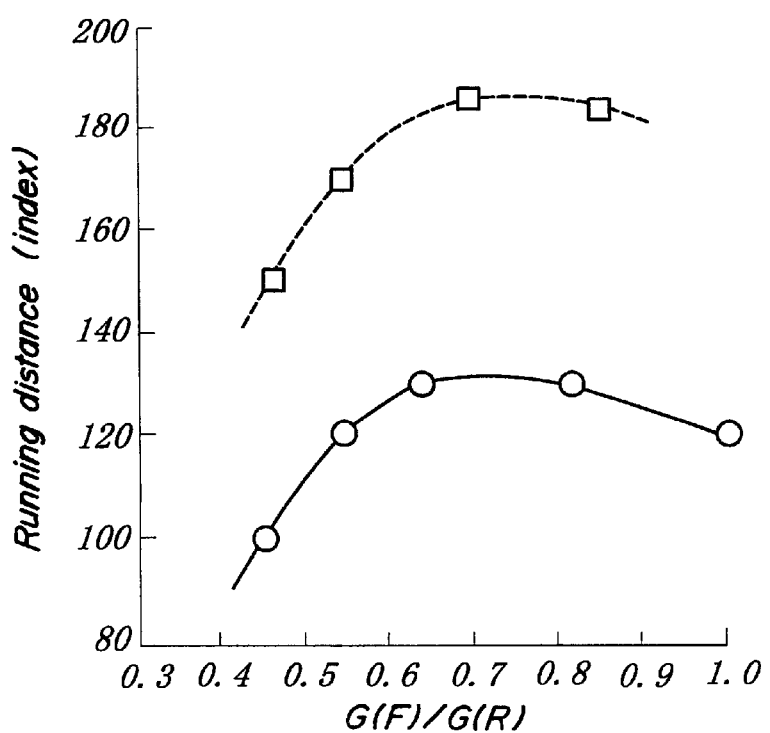

FIG_8
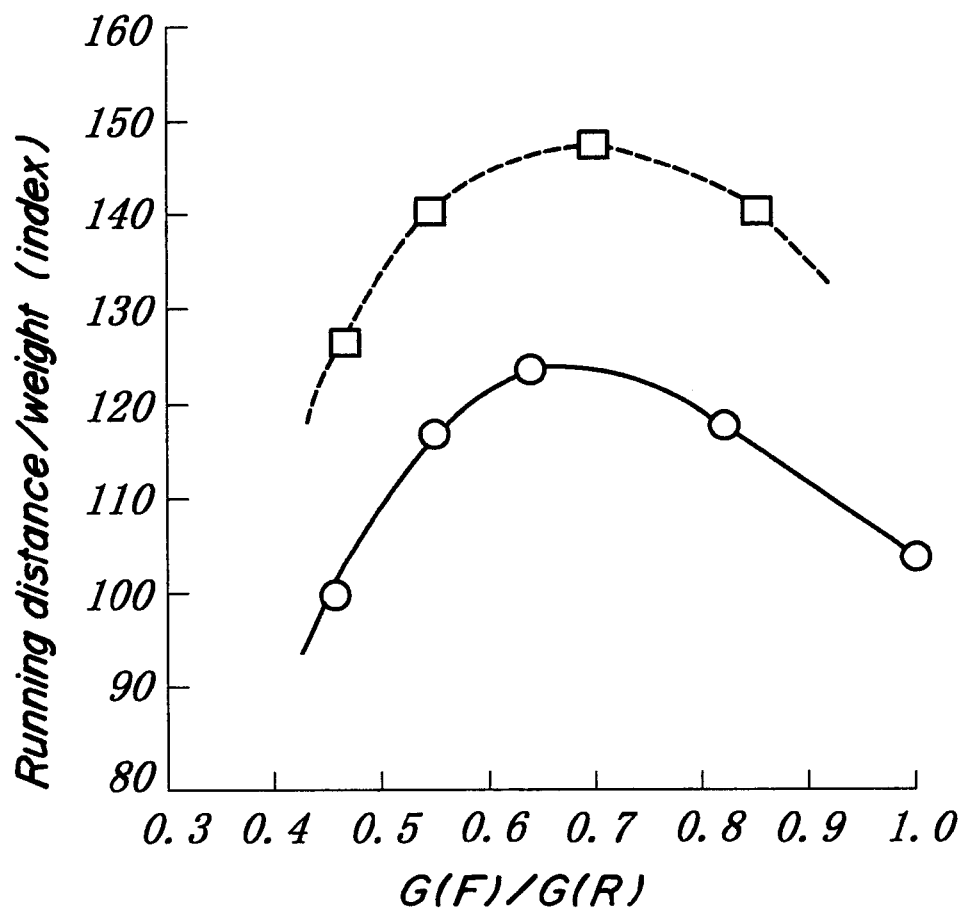

PNEUMATIC TIRES WITH RUN FLAT REINFORCING STRIP RUBBER

BACKGROUND OF THE INVENTION

1. Field of the Invention

This invention relates to a pneumatic tire, and more particularly to a pneumatic radial tire of so-called run-flat type capable of running over a given distance at a state that an internal pressure is zero or near to zero due to puncture or the like and having particularly an excellent run-flat durability (running at a puncture state).

2. Description of Related Art

A run-flat type radial tire (hereinafter referred to as a run-10 flat tire) is mainly used in vehicles such as passenger cars or the like in which a load applied to the tire is relatively small, and is required to satisfy a condition that even if the tire is suddenly punctured during the running of the vehicle on a general-purpose road or on an expressway at a high speed, the vehicle, particularly the passenger car can safely be run without damaging the steering stability. Hence it can safely be run up to a location capable of exchanging the tire over a given distance, for example, 80–160 km without separating the tire out from the used rim (approved rim) even in the continuity of running and breaking the tire.

For this end, the run-flat tires having various structures are proposed, occasionally, in a combination with a fully worked-out special rim. However, the combination with the special rim is too expensive and is lacking in general-purpose use, but does not contribute to directly or indirectly improve the tire durability to an expected extent though there is recognized an effect of preventing the separation of the tire from the rim. Therefore, the run-flat tire itself will be described with reference to examples below.

In JP-A-55-68406 is proposed a pneumatic safety tire having an excellent running durability at puncture wherein a pair of thick rubber reinforcements having a crescent shape at its section are arranged in an inner face of a portion of an innermost carcass ply located over a zone ranging from a bead portion through a sidewall portion to an end of a tread portion or between portions of carcass plies. The rubber reinforcement has a JIS hardness of at least 70 degrees, a tensile stress $M_{25}$ of not less than 10 kgf/cm$^2$ after an aging test in an inert environment of 140° C.±1° C. for 24 hours, and a rebound resilience of not less than 65% through a Dunlop tripsometer.

In JP-A-1-278806 is proposed a safety tire wherein a sidewall reinforcing rubber layer having a crescent shape at its section is arranged in an inner face of a sidewall portion and divided into inner layer portion, middle layer portion and outer layer portion in a rotating axial direction of the tire. A soft rubber having a Shore A hardness of 50–70° and a modulus at 100% elongation of 10–30 kgf/cm is applied to each of the inner and outer layer portions. A hard rubber having a Shore A hardness of 70–90° and a modulus at 100% elongation of 30–70 kgf/cm is applied to the middle layer portion, and a bead apex rubber having a Shore A hardness of 74–95° is further arranged.

In JP-A-3-176213 is proposed a run-flat pneumatic radial tire wherein a carcass has an up-down structure of 2 plies, and a reinforcing liner layer having a crescent shape at its section and made of rubber having a 100% modulus of not less than 60 kgf/cm and a 25 loss tangent at 100° C. of not more than 0.35 is arranged inside the carcass ply in a sidewall portion, and a bead filler rubber having a JIS hardness of 60–80 degrees is further arranged.

In JP-A-4-345505 is proposed a pneumatic safety tire comprising carcass plies of up-down structure wherein a thick reinforcing rubber having a crescent shape at its section and divided into a first inner reinforcing rubber layer and a second outer reinforcing rubber layer in a radial direction of the tire is arranged in an inner face of an inner carcass in a sidewall portion and a bead filler rubber is further arranged. The Shore A hardnesses of these rubbers are made higher in order of the first reinforcing rubber layer, second reinforcing rubber layer and the bead filler rubber.

Among the aforementioned various proposals, the run-flat tire having an excellent cost performance and hence being put into practice in market is a pneumatic radial tire comprising radial carcass plies of up-down structure developing an effect of mitigating degree of collapse deformation during the running at the flat state as far as possible, a pair of thick reinforcing rubber of hard and soft strips disposed at an inner face side of an innermost turnup ply from a position near to a bead core in a bead portion through a sidewall portion to an end of a tread portion and having a crescent shape at its section, and a hard bead filler rubber enveloped between turnup ply and down ply and extending from an outer peripheral face of the bead core up to a position near to a maximum width of the tire. The term "up-down structure" used herein means a ply structure of 2 or more plies comprising a turnup ply wound around a bead core from inside of the tire toward outside thereof and a down ply enveloping the turnup ply form the outside. In such a tire, a rubberized layer of Kevlar cords or steel cords (called as an insert ply) may be arranged in a zone ranging from the bead portion to the sidewall portion.

This type of the tire is higher in cost as compared with general-purpose tires and is frequently used in any expensive vehicles such as sport car, sport-type car, high-grade passenger car and the like. Therefore, the run-flat tire mainly applies to a low-section profile tire having an aspect ratio of not more than 55.

Even in the tires having the above structures proposed in the aforementioned articles, however, if the internal pressure rapidly decreases to zero, the steering stability in the vehicle running at a high speed is sufficiently ensured, but it can be said that the high-speed running continuity at the run-flat state and the durability in the long-distance running are still insufficient. Therefore, it is desired to develop tires further improving the run-flat durability while ensuring a low cost possible as far as possible.

A main trouble form relating to the run-flat durability, which has been observed up to the present, is that as running at the flat state proceeds, a nucleus for separation failure is caused between the bead filler rubber and the turnup ply (inner ply) near to the bead portion. The separation nucleus then grows up to the position of maximum width in the sidewall portion, and hence a remarkably large crack is caused in the thick reinforcing strip rubber located slightly outward from the maximum width position toward the tread portion to finally cause the tire breakage not conducting running continuity

SUMMARY OF THE INVENTION

It is, therefore, an object of the invention to provide a pneumatic tire not only guaranteeing the safe running of a vehicle such as a passenger car or the like at a time of causing rapid air removal due to puncture or the like but also improving the tire durability continuously running at the flat state to an extent satisfied by users as a run-flat tire.

According to the invention, there is the provision of a pneumatic tire comprising a carcass comprised of at least one rubberized cord ply of a radial arrangement reinforcing a pair of sidewall portions and a tread portion between a pair of bead cores embedded in a pair of bead portions, a belt comprised of two or more cross cord layers reinforcing the tread portion on an outer periphery of the carcass and a pair of thick reinforcing strip rubbers having a crescent shape at section thereof and located at an inner face side of an innermost carcass ply to extend from a position near to the bead core through the sidewall portion to an end of the tread portion, an improvement wherein each of the bead filler rubber and the reinforcing strip rubber has a JIS A hardness at 25° C. of not less than 70 degrees and a rebound resilience at 25° C. of not less than 65% and a ratio of JIS A hardness of the reinforcing strip rubber (Hs(R)) to JIS A hardness of the bead filler rubber (Hs(F)) is within a range of 0.9–1.15.

The term "carcass" used herein includes a case that the 15 carcass comprises only a turnup ply wound around the bead core from inside of the tire toward outside thereof and a case that the carcass comprises the turnup ply and a down ply enveloping the turnup ply together with a bead filler rubber from the outside of the turnup ply (two or more carcass plies). In case of the turnup ply, there are included a case that the turnup end is located in a zone ranging from the bead portion to the sidewall portion, a case that the turnup end is located between the belt and the outermost carcass ply in the tread portion (so-called first envelop structure), and a case that the turnup end is located at the outside of the belt in the radial direction of the tire (so-called second envelop structure).

As the cord for the carcass ply, use may be made of organic fiber cords such as polyester cord, rayon cord or the like, and inorganic fiber cords such as steel cord or the like. The detail of the steel cord will be mentioned later.

The measurements of JIS A hardness and rebound resilience are according to Spring Type Hardness Test (Type A) in "Hardness Test" and "Rebound Resilience Test" described on "Physical Testing Methods for Vulcanized Rubber" of JIS K6301-1995, respectively.

In preferable embodiment of the invention, it is practically effective to define a relationship between the bead filler rubber gauge and the reinforcing strip rubber gauge. That is, a ratio of maximum gauge $G_F$ (mm) of full bead filler rubber as measured in a normal direction drawn to an outer surface of the innermost carcass ply in the vicinity of the outer periphery of the bead core to maximum gauge $G_R$ (mm) of full reinforcing strip rubber as measured in a normal direction drawn to an inner surface of the innermost carcass ply in the vicinity of the maximum width position of the tire is within a range of 0.5–0.9.

BRIEF DESCRIPTION OF THE DRAWINGS

The invention will be described with reference to the accompanying drawings, wherein:

FIG. 2 is an X-ray photograph schematically illustrating one rubberized steel cord for the carcass ply;

FIG. 3 is an X-ray photograph schematically illustrating only the steel cord shown in FIG. 2;

FIG. 6 is a graph showing a relationship among rebound resilience, running distance on drum and maximum temperature of bead filler rubber;

FIG. 7 is a graph showing a relationship between ratio of maximum gauge of reinforcing strip rubber to maximum gauge of bead filler rubber and running distance on drum;

FIG. 8 is a graph showing values obtained by dividing the running distance on drum shown in FIG. 5 by total weight of reinforcing strip rubber and bead filler rubber.

PREFERRED EMBODIMENTS OF THE INVENTION

Figure 1:
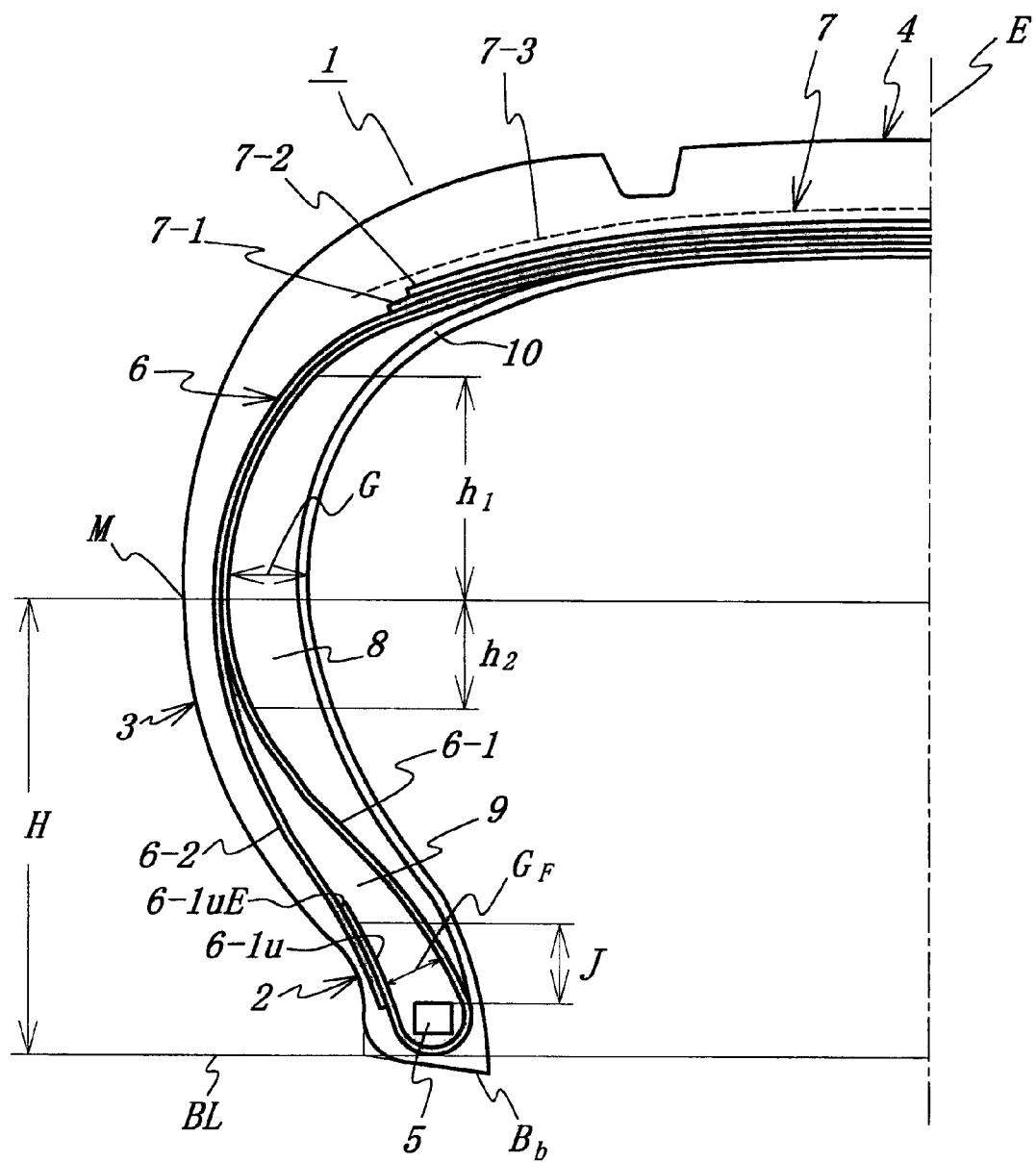
FIG. 1 is a diagrammatically left-side section view of an embodiment of the pneumatic tire according to the invention.

FIG. 1 shows a diagrammatically left-half section view of an embodiment of the pneumatic radial tire for passenger car according to the invention, FIG. 2 shows an X-ray photograph schematically illustrating one steel cord and rubber (shown by shadowed region) existing in steel filaments of the cord for the carcass ply, and FIG. 3 shows an X-ray photograph schematically illustrating only the steel cord after the removal of the rubber portion in FIG. 2.

In FIG. 1, the pneumatic radial tire for passenger car (hereinafter referred to as a tire) 1 comprises a pair of bead portions 2 (only one side is shown), a pair of sidewall portions 3 (only one side is shown), a tread portion 4 extending between the sidewall portions 3, a carcass 6 comprised of at least one rubberized cord ply of a radial arrangement reinforcing the above portions 2, 3, 4 between a pair of bead cores 5 embedded in the bead portions 2, two plies in the illustrated embodiment, and a belt 7 reinforcing the tread portion 4 on the outer periphery of the carcass 6.

The carcass 6 of the illustrated embodiment are comprised of a turnup ply 6-1 wound around the bead core 5 from inside of the tire 1 toward outside to form a turnup portion 6-1$u$ and a down ply 6-2 terminating in the vicinity of the bead core 5 at the outside of the turnup ply 6-1. In the up-down carcass 6 of the illustrated embodiment, the turnup ply 6-1 is an innermost carcass ply. As the carcass 6, however, there may be taken various ply structures such as only one turnup ply 6-1, combination of two turnup plies and one down ply, combination of one turnup ply and two down plies and the like though the illustration of such a combination is omitted.

When the carcass 6 is comprised of only one turnup ply 6-1, an end 6-1$u$E of the turnup portion 6-1$u$ is located in a zone ranging from a position near to the bead portion 2 to a position of a region of the belt 7 in the tread portion 4. The end 6-1$u$E of the turnup portion 6-1$u$ in the region of the belt 7 is located between the belt 7 and the ply 6-1 or between the belt 7 and a tread rubber 8. The latter type is particularly called an envelop carcass 6. The end 6-1$u$E of the envelop carcass 6 is located at any position in the region of the belt 7, but it is desirable to be located in the vicinity of an equatorial plane E of the tire as far as possible considering the improvement of bending rigidity in the radial direction of the tire 1.

As the ply cord of the carcass 6, there are a case of using organic fiber cords such as polyester cord, rayon cord and the like, and a case of using steel cord. The use of the steel cord is particularly effective to the carcass having the up-down structure of two or more plies and the carcass 6 of one ply. The details of the steel cord are described later.

The belt 7 is comprised of 2 or more cross cord layers, two cross cord layers in the illustrated embodiment, desirably two cross steel cord layers 7-1, 7-2 and includes an organic fiber cord layer arranged on an outer periphery of the cross layers as shown by dotted lines in FIG. 1, for example, a helically wound layer of 6,6-nylon 7-3. The steel cord cross layers 7-1, 7-2 have an arrangement that steel cords of these layers are crossed with each other with respect to an equatorial plane E of the tire, in which the width of the layer 7-1 adjacent to the carcass 6 is wider than the width of the layer 7-2 in the illustrated embodiment.

Also, the tire 1 is provided at inner face sides of the turnup ply 6-1 of the carcass 6 with a pair of thick reinforcing strip rubbers 8 (only one side is shown) having a crescent shape at their sections inherent to the run-flat tire. The reinforcing strip rubber 8 has a shape such that a gauge of a central zone in the radial direction of the tire is 8–16 mm and both end portions in the radial direction of the tire are tapered in order to stably support total weight of the vehicle during running even at an internal pressure of zero to prevent the separation of the tire 1 from the approved rim to thereby prevent the breakage of tire 1. The reinforcing strip 8 further maintains running stability even at a time of rapid puncture during the running at a high speed of, for example, 80–160 km/h.

In case of the tire 1 having the carcass 6 comprised of two turnup plies and one down ply, a thick reinforcing strip rubber (not shown) is provided between an outer face of the outermost turnup ply and an inner face of the down ply in addition to the above thick reinforcing strip rubber 8. On the other hand, in case of the tire 1 having the carcass comprised of one turnup ply and two down plies, a thick reinforcing strip rubber (not shown) is provided between an innermost down ply and an outermost down ply in addition to the above thick reinforcing strip rubber 8.

In addition to the reinforcing strip rubber 8, a bead filler rubber 9 taperingly extending outward from an outer peripheral surface of the bead core 5 in the radial direction of the tire is disposed between the turnup ply 6-1 and the down ply 6-2. The outer end of the bead filler rubber 9 in the radial direction extends up to at least a position of the maximum tire width. Thus, the down ply 6-2 takes a form of enveloping the turnup ply 6-1 through the bead filler rubber 9 from the outside thereof. This is the same in case of the two turnup plies. In the tire 1 having the carcass 6 of one ply, the bead filler rubber 9 extends between the main body of the turnup ply 6-1 (ply extending between a pair of the bead cores 5) and the turnup portion 6-1u along the main body of the ply 6-1 in the same manner as mentioned above. Moreover, numeral 10 is an innerliner made of a halogenated butyl rubber having an air impermeability. In this case, the tire 1 is a tubeless tire.

Each of the reinforcing strip rubber 8 and the bead filler rubber 9 is required to have a JIS A hardness at 25° C. of not less than 70 degrees and a rebound resilience at 25° C. of not less than 65%. Further, it is required that a ratio Hs(R)/Hs(F) of JIS A hardness Hs(R) of the reinforcing strip rubber 8 to JIS A hardness Hs(F) of the bead filler rubber 9 is within a range of 0.9–1.15.

The reason why the above rubber properties and the ratio Hs(R)/Hs(F) are restricted to the above ranges will be described based on experimental results using a tire having a size of 225/60R16 as a representation of the passenger car tire below. This tire has a structure shown in FIG. 1 and polyester cords are used in the plies 6-1, 6-2 of the carcass 6.

In a first experiment, a maximum gauge $G_R$ (details will be described later) and a height in radial direction of tire in the reinforcing strip rubber 8 are 11.0 mm and 135 mm, respectively. A maximum gauge $G_F$ (details will be described later) and a height in radial direction of tire in the bead filler rubber 9 are 6.0 mm and 45 mm, respectively. The reinforcing strip rubber 8 has a JIS A hardness of 80 degrees and a rebound resilience of 70%, while the ratio Hs(R)/Hs (F) is 4 levels, in which a conventional tire P has a lower limit of 0.88 (value of Hs(F) is 90 degrees). An experimental tire Q has a value of 1.00, an experimental tire R has a value of 1.10, and an experimental tire S has an upper limit of 1.20.

The comparative evaluation of the run-flat durability is conducted by pushing each of the conventional tire P and the experimental tires Q, R and S on a drum rotating at a peripheral speed of 90 km/h under an internal pressure of zero and a load of 570 kgf corresponding to a total vehicle weight to be mounted with each of these tires P, Q, R and S. The evaluation is based on a running distance (km) until the occurrence of tire trouble, which is represented by an index on the basis that the running distance of the conventional tire P is 100. The larger the index value, the better the tire durability. As a result, the index value of the experimental tire Q is 140 and that of the experimental tire R is 130, while that of the experimental tire S is only 70. These index values are shown by mark O in FIG. 4 and connected to each other as a smooth curved line.

Figure 4:
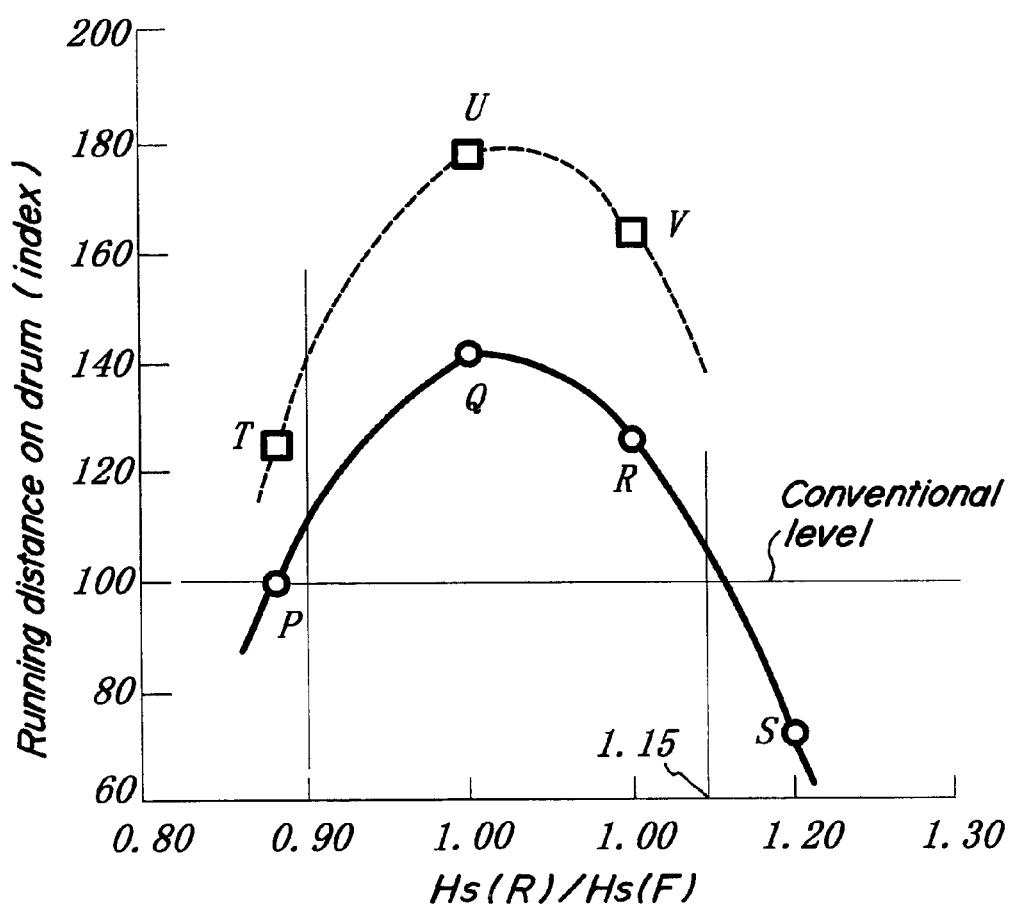
FIG. 4 is a graph showing a relationship between ratio of hardness of reinforcing strip rubber to hardness of bead filler rubber and running distance on drum.

As seen from FIG. 4, in order to obtain the run-flat durability exceeding that of the conventional tire P, it is required that the value of the ratio Hs(R)/Hs(F) is within a range of 0.9–1.15.

The maximum gauge $G_R$ of the reinforcing strip rubber 8 of 10.0 mm maximum gauge $G_F$ of the bead filler rubber $G_F$. of the bead filler rubber $G_F$ of 6.0 mm should be regarded to be an upper limit gauge for stopping the increase of tire weight against that of the usual tire weight to minimum s as far as possible. In order to ascertain universality of the first experiment, the test for the run-flat durability on the drum under the same test conditions as mentioned above is conducted as a second experiment by using an experimental tire T corresponding to the conventional tire P, an experimental tire U corresponding to the experimental tire Q and an experimental tire V corresponding to the experimental tire R. The JIS A hardness and rebound resilience of the reinforcing strip rubber 8 are 80 degrees and 70%. The maximum gauge $G_R$ of the reinforcing strip rubber 8 is 12.0 mm (height is the same as 135 mm), and the maximum gauge $G_F$ of the bead filler rubber 9 is 8.0 mm (height is the same as 45 mm).

The value of the ratio Hs(R)/Hs(F) is 0.88 in the experimental tire T, 1.00 in the experimental tire U and 1.10 in the experimental tire V. As a result of this test representing the running distance on the drum by an index on the basis that the conventional tire P is 100, the experimental tire T shows 125, while the experimental tires U and V show high levels of 178 and 164, respectively, which proves the reasonability of the first experiment in view of the inclusion of peak point in the experimental tire U. These index values are by mark in FIG. 4 and connected to each other as a smooth curved line (dotted lines).

Figure 5:
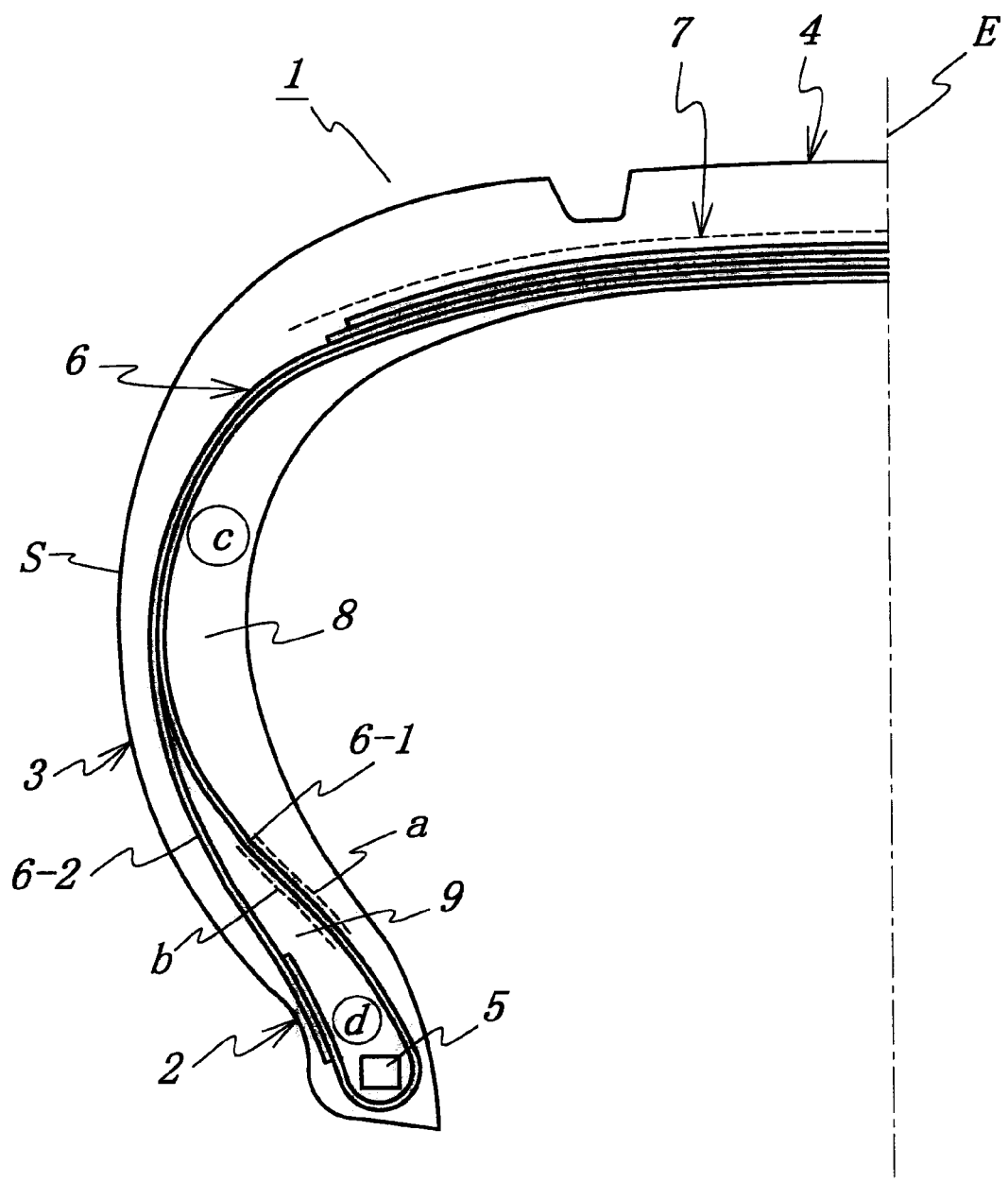
FIG. 5 is a diagrammatically left-side section view illustrating trouble places of the tire shown in FIG. 1.

Referring to FIG. 5, in the conventional tire P and the experimental tire T, strain concentrates between the bead filler rubber 9 having a higher rigidity and the turnup ply 6-1 of the carcass 6 because the hardness Hs(F) of the bead filler rubber 9 is largely harder than the hardness Hs(R) of the reinforcing strip rubber 8 as the value of the ratio Hs(R)/ Hs(F) is 0.88. As a result, it has been confirmed that a nucleus of ply separation is caused as shown by dotted lines b in FIG. 5, and the ply separation grows outward from the separation nucleus b in the radial direction of the tire and finally cracks are caused in a portion shown by symbol c in FIG. 5 to bring about breakage of the tire, which is impossible to continue running.

On the other hand, as shown in the experimental tire 5, when the hardness Hs(R) of the reinforcing strip rubber 8 is to harder over the limit as compared with the hardness Hs(F) of the bead filler rubber 9, the rigidity of the reinforcing strip rubber 8 is largely higher than the rigidity of the bead filler rubber 9, so that strain concentrates between the reinforcing strip rubber 8 and the turnup ply 6-1 of the carcass 6.

Consequently, a nucleus of ply separation is caused at a position a shown by dotted lines in FIG. 5, and the ply separation grows outside from the separation nucleus a in the radial direction of the tire likewise the above case and finally cracks are caused in a portion shown by symbol c in FIG. 5 to bring about the breakage of the tire, which is impossible to continue running.

When the difference of rigidity between the reinforcing strip rubber 8 and the bead filler rubber 9 sandwiching the turnup ply 6-1 is large during the running of the tire 1 at a flat state under loading, divergence is caused between the mutual rubbers 8 and 9. When the divergence is large, a large shearing strain is concentrically applied to the turnup ply 6-1 to create the aforementioned separation nuclei a, b.

On the other hand, in case of the experimental tires Q, R, U, V, the hardness Hs(R) of the reinforcing strip rubber 8 and the hardness Hs(F) of the bead filler rubber 9 are maintained at a proper balancing state, so that a proper rigidity distribution is attained between the mutual rubbers 8 and 9. As a result, strain concentration is not caused in the dotted line portions a, b and hence the nuclei a, b of ply separation are not created and the separation outward in the radial direction of the tire does not grow and cracks are caused only in the portions shown by marks c, d alone. This largely delays the time of creating cracks in the portions c, d, so that the running distance on the drum may largely be extended by 20–40% as compared with that of the conventional tire P and the experimental tire T and hence the run-flat durability is largely improved.

When the tire 1 is run at the flat state under loading, opposed portions of the reinforcing strip rubber 8 and the bead filler rubber 9 sandwiching the turnup ply 6-1 are apt to be high temperature due to the increase of heat generation quantity, so that it is particularly important to prevent blow-out failure of the bead filler rubber 9 due to such a high temperature. As a third experiment, the running distance on the drum and maximum temperature (° C.) inside the bead filler rubber 9 are measured under the same conditions as in the first experiment by using a tire 1 provided with a bead filler rubber 9 having three kinds of rebound resilience at 25° C. of 50%, 65% and 80% as represented by the experimental tire. The results are shown in FIG. 6.

In FIG. 6, a left-side ordinate shows the running distance on the basis that the conventional tire P is 100, and a right-side ordinate shows a maximum temperature (° C.) inside the bead filler rubber 9. As seen from FIG. 6, when the rebound resilience is less than 65%, the degree of decreasing the running distance on the drum is remarkable and also the temperature rising degree of the bead filler rubber 9 is conspicuous. In order to prevent the blow-out failure of the bead filler rubber 9 due to the higher temperature, it is required to restrict the maximum temperature to not higher than 150° C. In order to ensure the running distance on the drum of not less than 140 as an index value, it is required to restrict the rebound resilience of the bead filler rubber 9 to not less than 65%. Of course, this is applied to the case of the reinforcing strip rubber 8 though the illustration is omitted.

Although the above is described with respect to one kind of the passenger car tire 1, when the same experiments are repeated to the other various sizes of the tire, all of the results are the same as described above. As to at least passenger car tire 1, therefore, the run-flat durability of the tire is largely improved when each of the reinforcing strip rubber 8 and the bead filler rubber 9 has a JIS A hardness at 25° C. of not less than 70 degrees and a rebound resilience at 25° C. of not less than 65%, and the ratio Hs(R)/Hs(F) of hardness Hs(R) of the reinforcing strip rubber 8 to hardness Hs(F) of the bead filler rubber 9 is within a range of 0.9–1.15.

Referring to FIG. 1, it is practically effective to more improve the run-flat durability when the ratio $G_F/G_R$ of maximum gauge $G_F$ (mm) of full bead filler rubber 9 as measured in a normal direction drawn to an outer surface of an innermost turnup ply 6-1 in the vicinity of the bead core 5 to maximum gauge $G_R$ (mm) of full reinforcing strip rubber 8 as measured in a normal direction drawn to an inner surface of the innermost turnup ply 6-1 in the vicinity of a line segment connecting positions M of a maximum tire width (only one side is shown) is within a range of 0.5–0.9.

The maximum gauge $G_R$ (mm) of the full reinforcing strip rubber 8 used herein means that when the carcass 6 comprises two turnup plies and has also a reinforcing strip rubber (not shown) between the two plies, a total value is obtained by adding gauges (mm) of these reinforcing strip rubbers. When the carcass comprises two down plies and also has a reinforcing strip rubber (not shown) between these plies, there is used a total gauge $G_R$ (mm) obtained by adding gauges (mm) of these reinforcing strip rubbers. The maximum gauge $G_F$ (mm) of the full bead filler rubber used herein means a total gauge $G_F$ (mm) obtained by adding gauges of bead filler rubber portions even when the bead filler rubber is divided into two or more portions.

It is favorable that positions of the maximum gauge $G_R$ (mm) and the position of the maximum gauge $G_F$ (mm) are defined as follows. As to the position of maximum gauge $G_R$ (mm), a portion of the maximum gauge $G_R$ (mm) is located within a range of sum of heights ($h_1+h_2$), wherein with respect to a height H (mm) of the position M corresponding to the maximum tire width as measured from a bead base line BL parallel to the rotating axis of the tire and passing through an intersect between an extension line of a bead base Bb and an extension line of a surface of a lower part of the bead portion 2 contacting with a flange of a rim in FIG. 1, a height $h_1$ from a line segment connecting the positions M of the maximum tire width outward in the radial direction of the tire is 0.6 H and a height $h_2$ from the above line segment inward in the radial direction of the tire is 0.3 H. Then, as to the maximum gauge $G_F$ (mm), as shown in FIG. 1, a maximum height J (mm) as measured from an outer peripheral surface of the bead core outward in the radial direction of the tire is placed within a range corresponding to 0.3 times the height H (mm) of the position M of the maximum tire width.

While running of the tire 1 at the flat state under loading, when the ratio $G_F/G_R$ is less than 0.5, the degree of flex deformation of the bead filler rubber 9 in the vicinity of symbol d (see FIG. 5) is larger than the degree of flex deformation of the reinforcing strip rubber 8 in the vicinity of symbol c (see FIG. 5), and hence a premature failure is caused in the bead filler rubber 9 near to the symbol d. When the ratio $G_F/G_R$ exceeds 0.9 the degree of flex deformation of the reinforcing strip rubber 8 in the vicinity of symbol c is larger than the degree of flex deformation of the bead filler rubber 9 in the vicinity of symbol d. Hence a premature failure is caused in the reinforcing 10 strip rubber 8 near to the symbol c.

On the contrary, when the ratio $G_F/G_R$ is within a range of 0.5–0.9, the degree of flex deformation of the reinforcing strip rubber 8 in the vicinity of symbol c is properly balanced with the degree of flex deformation of the bead filler rubber 9 in the vicinity of symbol d, whereby the run-flat running distance is made longest. This means that strain becomes substantially equal between the reinforcing strip rubber 8 near the symbol c and the bead filler rubber 9 near the symbol d and trouble of the rubber in the vicinity of the symbol c and trouble of rubber in the vicinity of the symbol d are caused substantially at the same time.

As a fourth experiment, the value of the ratio $G_F/G_R$ is changed while using the same tire size, load condition and peripheral speed as in the first experiment to measure the running distance on the drum at the run-flat state. The results are represented by an index on the basis that the control tire is 100 and shown in FIG. 7. Further, values calculated by dividing the index of the run-flat running distance in the changed value of the ratio $G_F/G_R$ by total weight (kgf)= weight of reinforcing strip rubber 8 (kgf)+weight of bead filler rubber 9 (kgf) are represented by an index on the basis that the control tire is 100 and shown in FIG. 8. In addition, gauges $G_F$(mm), $G_R$ (mm), ratio $G_F/G_R$, index of running distance, various weights (kgf), (index of running distance)/ total weight (kgf) and the like are shown in Table 1.

pressure of zero is measured, and thereafter a running distance on drum until the occurrence of troubles is measured at the inner pressure of zero under a condition that the load and peripheral speed are the same as in the first experiment.

Figure 9:
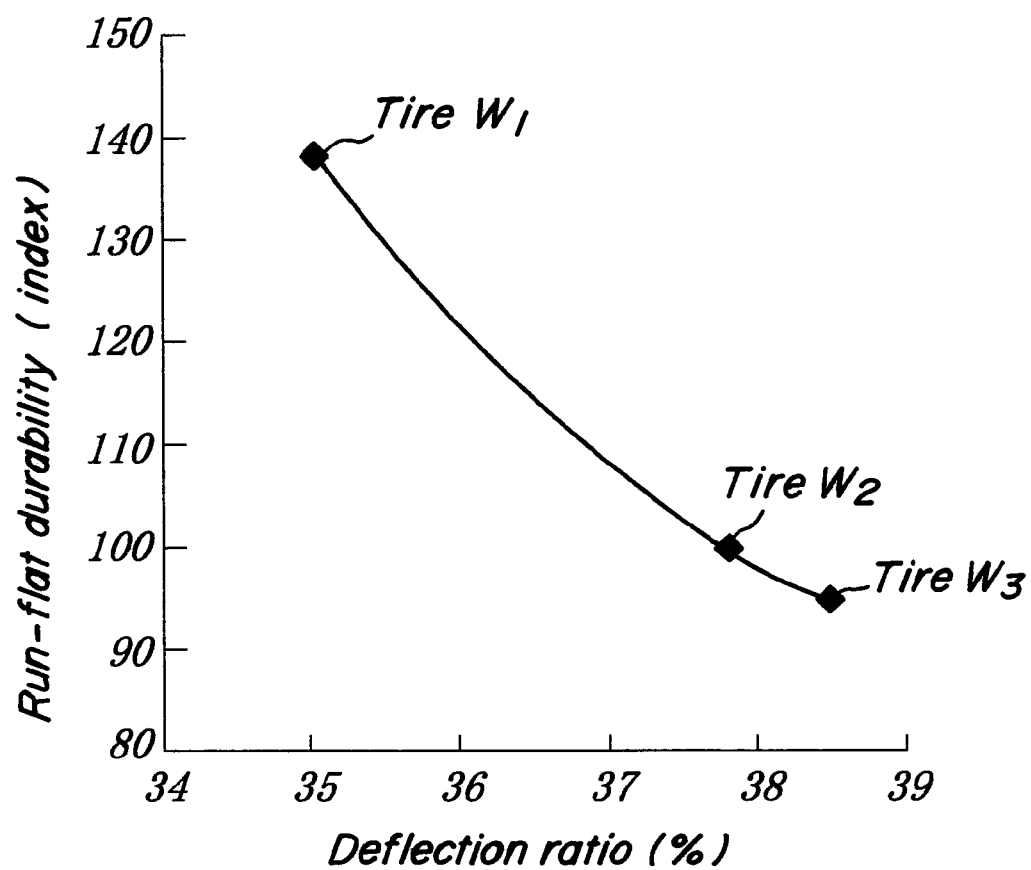
FIG. 9 is a graph showing a relation between flexing ratio and run-flat durability.

The deflection ratio (%) is represented by a percentage (($\delta$/SH)×100) of a value of a ratio of deflection $\delta$ (mm) of the tie at the inner pressure of zero under a load of 570 kgf to a tire height SH (mm) when the tire is inflated at an inner pressure of 1.5 kgf/cm$^2$ corresponding to the load of 570 kgf (according to JATMA YEAR BOOK-1998). The measured result of the deflection ratio is 35.0% in the tire $W_1$, 37.8% in the tire $W_2$ and 38.5% in the tire $W_3$, respectively. Also, the running distance on drum until the occurrence of problems is represented by an index on the basis that the tire $W_2$ is 100 and shown in FIG. 9. As seen from FIG. 9, the tire using the steel cord having a high bending rigidity is excellent in the run-flat durability.

As the steel cord, it is favorable to use steel cords having a high elongation property that total elongation at break of a cord at a bare state (according to JIS G-3510-1986) is not less than 3.5%, desirably not less than 4.0%. Moreover, such steel cords are desired to have a property based on the following test.

In FIGS. 2 and 3, a ratio of total area of steel filaments occupied in an area of a cord composite excluding a portion projected from an outermost filament (area occupying ratio R) in a length of 15 mm in a longitudinal direction optionally selected from the X-ray photograph of one steel cord-rubber composite, which is taken out from the plies 6-1, 6-2 of the carcass 6, is within a range of 0.45–0.95. The length 15 mm

TABLE 1

| Experiment No. | 1 | 2 | 3 | 4 | 5 | 6 | 7 | 8 | 9 |
|---|---|---|---|---|---|---|---|---|---|
| Maximum gauge $G_R$ (mm) | 11.0 | 11.0 | 11.0 | 11.0 | 11.0 | 13.0 | 13.0 | 13.0 | 13.0 |
| Maximum gauge $G_F$ (mm) | 5.0 | 6.0 | 7.0 | 9.0 | 11.0 | 6.0 | 7.0 | 9.0 | 11.0 |
| Ratio $G_F/G_R$ | 0.45 | 0.55 | 0.64 | 0.82 | 1.00 | 0.46 | 0.54 | 0.69 | 0.85 |
| Running distance (index) | 100 | 120 | 130 | 130 | 120 | 150 | 170 | 186 | 184 |
| Weight of rubber 8 (kgf) | 2.80 | 2.80 | 2.80 | 2.80 | 2.80 | 3.31 | 3.31 | 3.31 | 3.31 |
| Weight of rubber 9 (kgf) | 0.39 | 0.47 | 0.55 | 0.71 | 0.86 | 0.47 | 0.55 | 0.71 | 0.86 |
| Total weight (kgf) | 3.19 | 3.27 | 3.35 | 3.51 | 3.66 | 3.78 | 3.86 | 4.02 | 4.17 |
| Distance/total weight | 31.35 | 36.70 | 38.81 | 37.04 | 32.79 | 39.68 | 44.04 | 46.27 | 44.12 |
| Distance/total weight (index) | 100.0 | 117.1 | 123.8 | 118.1 | 104.6 | 126.6 | 140.5 | 147.6 | 140.8 |

The steel cord applied to the ply 6-1 (one ply inclusive of envelop) and plies 6-1, 6-2 (up-down structure) in the carcass 6 is described in detail below.

The steel cord has a twisting structure of 1×n or 1+n wherein n is an integer of 2–7. A diameter of a steel filament constituting the steel cord is within a range of 0.125–0.275 mm.

As a fifth experiment, there are firstly provided experimental tires $W_1, W_2, W_3$ having the same structure as the tire 1 shown in FIG. 1 and the same tire size as in the first experiment, wherein the cord used in the plies 6-1, 6-2 of the carcass 6 is a steel cord having a twisting structure of 1×5×0.15 (filament diameter=0.15 mm) in the tie $W_1$, a rayon cord of 1650D/2 (SI unit: 1840 dtex/2) in the tire $W_2$, and a polyester cord of 1500D/2 (SI unit: 1670 dtex/2) in the tire $W_3$, respectively. Then, a deflection ratio (%) at an inner in the longitudinal direction of the cord means 15 mm as a cord length in the X-ray photograph. The area occupying ratio R is represented by R=F/A when an area of cord-rubber composite (shadowed portion) as a whole is A and an area of total filaments occupied in the composite is F.

In case of the carcass 6 of one ply, the area occupying ratio R is an average of 10 measured values when an X-ray is irradiated to the sidewall portion 3 in the vicinity of a position S of a maximum width of the tire 1 from a direction perpendicular to the surface of the sidewall portion 3 at 10 places in the circumferential direction of the tire by using K-2 model made by Softec Co., Ltd. to obtain 10 X-ray photographs. When the carcass 6 is comprised of two plies, it is difficult to conduct an accurate measurement because the steel cord-rubber composites in these plies overlap with each other, so that after each ply is taken out from the tire 1, the X-ray photograph with respect to the each ply is obtained in the same manner as mentioned above to determine the area occupying ratio R as an average of 10 measured values.

When the area occupying ratio R is less than 0.45, a contact area between each filament and rubber increases to more control corrosion propagation through water content, but a tensile modulus as the steel cord becomes too low and hence the bending rigidity required in the carcass 6 can not be satisfied. When the area occupying ratio R exceeds 0.95, the filament itself hardly deforms and the resistance to compression fatigue is degraded. Moreover, the area occupying ratio R is preferably within a range of 0.50–0.90, more particularly 0.55–0.75.

The steel cord having an area occupying ratio R of 0.55–0.75 is so-called open twisted cord having a wide space in an inside of an outer cord envelop in which the filaments are substantially independent in rubber matrix and contact with each other in a point at most. By using such an open twisted steel cord, the run-flat durability can be more improved over a full running distance of the tire 1 because (1) a greater amount of rubber can be penetrated into the inside of the steel cord to increase the bending rigidity of the steel cord and hence the deflection amount 6 of the tire 1 during running at a flat state can be more decreased to more contribute to the improvement of the run-flat durability; (2) the contact area between rubber and each filament in the steel cord is increased to control abrasion due to friction between mutual filaments or fretting and the deterioration of the corrosion resistance of the steel cord due to the fretting can largely be improved; and (3) the increase of the contact area between rubber and each filament controls the penetration of water into a space between the filaments in the steel cord and hence the corrosion propagation of the steel cord through water can be controlled.

EXAMPLES

In these examples, there is provided a pneumatic radial tire 20 having a size of 215/65R15 and a structure shown in FIG. 1, wherein the carcass 6 has a two ply structure comprised of a turnup ply 6-1 and a down ply 6-2, each ply being a rubberized ply of radial-arranged rayon cords of 1650 D/2 (1840 dtex/2 in SI), and the belt 7 is comprised of two steel cord cross layers 7-1, 7-2 and a helically wound and rubberized layer 7-3 of nylon-6, 6 cords.

With respect to tires of Examples 1–6, JIS A hardness Hs(R) of reinforcing strip rubber 8 and JIS A hardness Hs(F) of bead filler rubber 9 at 25° C., ratio Hs(R)/Hs(F), rebound resilience RR (%) of reinforcing strip rubber 8 and rebound resilience $R_F$ (%) of f bead filler rubber 9 at 25° C., maximum gauge $G_R$ (mm) of reinforcing strip rubber 8, maximum gauge $G_F$ (mm) of bead filler rubber 9 and ratio $G_F/G_R$ are shown in Table 2 together with those of the conventional tire and comparative tire. Moreover, the height of the reinforcing strip rubber in the radial direction of the tire is 140 (mm) and the height of the bead filler rubber 9 in the radial direction of the tire is 47 (mm) in these tires.

The test for the run-flat durability on a drum is carried out by applying a load of 540 kgf (corresponding to 76% of maximum load capacity described in JATMA YEAR BOOK-1997) to each test tire of Examples 1–6, Conventional Example and Comparative Example under an internal pressure of zero. The running distance (km) until the occurrence of failure is measured as a run-flat durability and is represented by an index on the basis that the conventional tire is 100. Such an index value is shown in a lower column of Table 2 together with an index of (index of running distance/total weight (kgf), and further the failure position shown in FIG. 5 is shown in a lowest column of Table 2 as symbols a–d. The larger the index value, the better the property. Moreover, (index of running distance)/total weight (kgf) is abbreviated as distance/total weight in Table 2.

TABLE 2

| Items | Conventional Example | Comparative Example | Example 1 | 2 | 3 | 4 | 5 | 6 |
|---|---|---|---|---|---|---|---|---|
| Hardness of rubber 8, Hs(R) (degree) | 79 | 70 | 79 | 70 | 79 | 79 | 79 | 79 |
| Hardness of rubber 9, Hs(F) (degree) | 90 | 80 | 79 | 70 | 79 | 79 | 79 | 79 |
| Ratio Hs(R)/Hs(F) | 0.88 | 0.88 | 1.00 | 1.00 | 1.00 | 1.00 | 1.00 | 1.00 |
| Rebound resilience of rubber 8 (%) | 65 | 65 | 65 | 80 | 65 | 65 | 65 | 65 |
| Rebound resilience of rubber 9 (%) | 50 | 65 | 65 | 80 | 65 | 65 | 65 | 65 |
| Maximum gauge $G_R$ (mm) | 11.0 | 11.0 | 11.0 | 11.0 | 11.0 | 11.0 | 11.0 | 11.0 |
| Maximum gauge $G_F$ (mm) | 5.5 | 5.5 | 5.5 | 7.5 | 5.0 | 7.5 | 9.9 | 11.0 |
| Ratio $G_F/G_R$ | 0.50 | 0.50 | 0.50 | 0.70 | 0.45 | 0.70 | 0.90 | 1.00 |
| Running distance on drum (index) | 100 | 102 | 130 | 170 | 106 | 168 | 160 | 142 |
| Distance/total weight (index) | 100 | 102 | 130 | 164 | 106 | 162 | 151 | 126 |
| Failure position | a | a | d | d, c | d | d, c | d, c | c |

As seen from the values of running distance on drum (index) or values for the run-flat durability in Table 2, the tires of Examples 1–6 develop a considerably excellent run-flat durability as compared with those of the conventional tire and comparative tire but also are remarkably superior in the distance/total weight or index value of (index of running distance)/total weight (kgf) to the conventional tire and comparative tire.

Moreover, it has been confirmed that even when the steel cord is applied to only the turnup ply 6-1 or both turnup ply 6-1 and down ply 6-2 in the carcass 6 of tire 1 (having the same tire size as mentioned above), the run-flat durability and the (index of running distance)/total weight (kgf) are considerably improved likewise the tires of Examples 1–6 as compared with the conventional tire using the 70) same kind of the steel cord ply. Therefore, the tire using the steel cord in he carcass ply according to the invention is adaptable to applications capable of allowing a slight increase of tire weight.

According to the invention, there can be provided pneumatic tires capable of developing considerably excellent run-flat durabilitys compared with the conventional run-flat tire under the same weight as the conventional tire only by specifying values of JIS hardness and rebound resilience in the bead filler rubber and reinforcing strip rubber, specifying the range of hardness ratio between both the rubbers, and further specifying the range of ratio of maximum gauge of the reinforcing strip rubber to maximum gauge of the bead filler rubber while applying the organic fiber cord or the steel cord to the carcass ply.

What is claimed is:

1. A pneumatic tire comprising; a carcass comprised of at least one rubberized ply of a radial arrangement reinforcing a pair of sidewall portions and a tread portion between a pair of bead cores embedded in a pair of bead portions, a bead filler rubber taperingly extending outward from an outer peripheral surface of each bead core in the radial direction of the tire, a belt comprised of two or more cross cord layers reinforcing the tread portion on an outer periphery of the carcass and a pair of thick reinforcing strip rubbers having a crescent shape at a cross-section thereof and located at an inner face side of an innermost carcass ply to extend from a position near to the bead core through the sidewall portion to an end of the tread portion, wherein each of the bead filler rubber and the reinforcing strip rubber has a JIS A hardness at 25° C. of not less than 70 degrees and a rebound resilience at 25° C. of not less than 65% and a ratio of JIS A hardness of the reinforcing strip rubber Hs(R)) to JIS A hardness of the bead filler rubber (Hs(F)) is within a range of 0.9–1.15.

2. A pneumatic tire according to claim 1, wherein the bead filler rubber and the reinforcing strip rubber have such a gauge that a ratio of maximum gauge $G_F$ (mm) of full bead filler rubber as measured in a normal direction drawn to an outer surface of the innermost carcass ply in the vicinity of the outer periphery of the bead core to maximum gauge $G_R$ (mm) of full reinforcing strip rubber as measured in a normal direction drawn to an inner surface of the innermost carcass ply in the vicinity of the maximum width position of the tire is within a range of 0.5–0.9.

3. A pneumatic tire according to claim 1, wherein said carcass comprises a turnup ply wound around the bead core from an inside of the tire toward the outside thereof and a down ply encapsulating the bead filler rubber extending from the bead core toward the tread portion and the turnup ply and terminated in the vicinity of the other bead core.

* * * * *